(12) United States Patent
Bruckbauer

(10) Patent No.: US 7,842,739 B2
(45) Date of Patent: Nov. 30, 2010

(54) METHOD OF APPLYING A COMPACT HARDENED COATING TO A BUILDING SURFACE AND A COMPOSITION FOR FORMING THE COATING

(75) Inventor: Alexander Bruckbauer, St. Peter am Hart (AT)

(73) Assignee: Osterreichische Vialit Gesellschaft mbH, Braunau/Inn (AT)

( * ) Notice: Subject to any disclaimer, the term of this patent is extended or adjusted under 35 U.S.C. 154(b) by 0 days.

(21) Appl. No.: 12/577,278

(22) Filed: Oct. 12, 2009

(65) Prior Publication Data

US 2010/0028531 A1    Feb. 4, 2010

Related U.S. Application Data

(62) Division of application No. 10/546,857, filed as application No. PCT/EP2004/001795 on Feb. 24, 2004, now abandoned.

(30) Foreign Application Priority Data

Feb. 27, 2003   (EP)   .................................. 03004183

(51) Int. Cl.
   *C08L 95/00*   (2006.01)
(52) U.S. Cl. ...................... 524/59; 427/138; 427/421.1; 427/139; 106/273.1
(58) Field of Classification Search .................... 524/59

See application file for complete search history.

(56) References Cited

U.S. PATENT DOCUMENTS

| | | | | | |
|---|---|---|---|---|---|
| 3,635,863 | A | * | 1/1972 | Drukker | ....................... 524/59 |
| 4,657,595 | A | * | 4/1987 | Russell | ....................... 106/277 |
| 5,763,014 | A | * | 6/1998 | Pickett | .................... 427/430.1 |
| 2002/0114940 | A1 | * | 8/2002 | Clemens et al. | .......... 428/318.4 |
| 2002/0170982 | A1 | * | 11/2002 | Hunter | ....................... 239/398 |

* cited by examiner

*Primary Examiner*—Vasu Jagannathan
*Assistant Examiner*—Doris L Lee
(74) *Attorney, Agent, or Firm*—Jonathan Myers; Andrew Wilford

(57) ABSTRACT

A two-component composition is disclosed and a method of applying the composition to a surface to form thereon a hardened compact coating, wherein each component remains separate until conveyed to a mixer for forming therein, a mixture of the two components, allowing seamless production of a liquid foil on the surface, and that hardens reactively to form a hardened compact coating, which comprises:
   (i) a first component which comprises:
      a 60-70% mixture of bitumen and water in a quantity of 50 to 100 partial mass %; and
   (ii) a second component which comprises:
      20 to 50 partial mass % filling material, and
      40 to 80 partial mass % softening, non-volatile oil, and wherein the first component and the second component are present in a ratio of 100:10 up to 50 mass %.

15 Claims, No Drawings

METHOD OF APPLYING A COMPACT HARDENED COATING TO A BUILDING SURFACE AND A COMPOSITION FOR FORMING THE COATING

CROSS REFERENCE TO RELATED APPLICATIONS

This application is a division of co-pending U.S. patent application Ser. No. 10/546,857 filed 29 Sep. 2006, which is the U.S. National Phase of PCT Application PCT/EP2004/001795 filed 24 Feb. 2004 with a claim to the priority of European Patent Application 03004183.4 itself filed 27 Feb. 2003.

FIELD OF THE INVENTION

The invention relates to a coating material that hardens reactively without solvent evaporation and with an evaporation of maximal 15 mass % water as well as the use thereof and a method for applying the same to all types of buildings. According to the invention vertical surfaces (such as walls, (trapezoid) plates for industrial halls, cladding elements) can be coated as well as horizontal surfaces (such as ceilings, flat roofs, floors, parts of bridges and roads), inclined surfaces (such as dams, gutters, channels) and the transition parts of different construction sites (such as connections of walls with the floor plate).

BACKGROUND OF THE INVENTION

In structural engineering buildings made of concrete or other building materials, as e.g. road asphalt, are generally coated in various ways to avoid the penetration of water. Concrete, asphalt and the like used as a construction body which is to a large extent rigid, are generally vulnerable to the creation of cracks (subsidence cracks and tension cracks, for static or thermal reasons) or holes or potholes. Such cracks promote the penetration of water. In order to avoid this, permanently plastic or elastic-viscous coatings are applied to the side of the construction body which faces the stream of penetrating water. Buildings composed of other building materials such as wood, clinker, clay can be sealed in the same or in a similar way.

According to the prior art such sealing coatings are produced in the following different ways:
  a. gluing on or melting on of sheets or foils, e.g. roof sheets, bitumen sheets, self-adhesive bitumen- or polymer modified bitumen sheets et al. The application of layers demands preparatory works like the application of a primer, work on scaffolding, handling of open flames, cutting and overlapping of the sheets, etc. If the work has to be carried out outdoors, the wind might significantly complicate it. Passages, corners and edges significantly complicate working with sheets and foils and often are weak spots for leakages. The working teams have to be technically skilled, adequately trained and be good team workers to carry out impeccable work.
  b. laying on or spraying on of hot liquid thermoplastic substances such as bitumen, polymer modified bitumen, plastics. Apart from a very complex heat-spraying technology these steps require dry, warm weather, dry bases and require a large work effort and involve risks for the construction staff, high energy consumption, etc.
  c. laying on or spraying on of substances containing solvents. During the last years this method was practically no longer applied or was limited to very small construction sections due to environmental protection issues (evaporation of solvents contained in the coating which are harmful to the environment).
  d. laying on or spraying on of liquids, mainly bitumen emulsions, polymer modified bitumen emulsions, synthetic dispersions or natural rubber dispersions. This type of coating can also be applied to lightly moist bases, although only thin layers can be applied in one working cycle, as on the one hand the draining off on horizontal surfaces does not allow thicker layers and on the other hand water has to evaporate while the layers are drying. Binder systems generally contain about 30% water. Entrapped water leads to bubble formations and sealing damage. The layers generally contain foam bubbles due to the foam emulsifiers in the emulsions and consequently are not completely free of imperfections. At least 3 to 4 layers have to be applied one upon the other and have to be dried thoroughly in between, which results in a high work effort and expenditure of time. The temperature of the base has to be high enough to allow an efficient evaporation of water and formation of a film enfolding the erosion particles, which generally means at least +15° C. If rain falls soon after the coating, the not yet completely dried layers can be damaged partially or washed away completely, which leads to further work effort and to highly disturbing contaminations at the construction site. The result can also be highly affected by frost, even short night frosts. Very hot weather (sunny side) often causes the formation of a skin, thus water remains enclosed in the layer and bubbles might be formed. In order to avoid these disadvantages, two-component spraying systems were developed, also spraying a precipitant (generally aqueous based), which quickly leads to a breaking of the emulsions. Thereby draining and washing off during rain fall can be avoided to a large extent, but the drying times have to be respected all the same and the minimum film formation temperatures are necessary. These coating systems do not qualify either for the cooler construction season.
  e. In addition to the application of the sealing binder film, it is often necessary in construction practice to apply insulating boards to the building structures and to permanently lute them. All methods described before require a gluing or doweling of the insulating boards in further complex work steps. Generally the latter method causes mechanical damage to the seals which leads to a reduction of the leak-tightness, or the insulating boards take up water from the gluing dispersions which results in an insufficient durability.

OBJECT OF THE INVENTION

It is the object of the present invention to find a coating material, a use and a method for applying said coating material, which avoid the disadvantages mentioned above and which can be also used in late fall or winter climates, that means at temperatures close to the freezing point.

SUMMARY OF THE INVENTION

In contrast to the methods applied so far the coating material according to the invention can be used for the coating of building surfaces at a temperature from +1° C. upward, that means in a late fall or winter climate.

My invention includes a coating material that hardens reactively without solvent evaporation and with an evaporation of maximal 15 mass % water, composed of at least two components, wherein:

the first component contains a 60-70% mixture of bitumen and water in a quantity of 50 to 100 partial mass %, 0 to 50 partial mass % synthetic latex or natural latex, polyvinyl acetate emulsion, or acrylate emulsion, paraffin emulsion or wax emulsion and 0 to 10 partial mass % viscosity control agent, thixotropic additives and adhesion improving additives, and wherein the second component contains 20 to 50 partial mass % filling material, 40 to 80 partial mass % softening, non-volatile oil and 0 to 10% by weight viscosity control agent, dispersing aids and wetting agents for oily phases, and that the first component and the second component are mixed in a ratio of 100:10 up to 50 mass %.

The softening, non-volatile oil is preferably a mineral oil, a vegetable oil or a derivative thereof or a synthetic oil.

The filling materials are selected from the group consisting of rock meal, talc, cement, lime powder, gypsum, fly ash cement and scoria derived from iron or steel production.

The thixotropic additives are selected from the group consisting of fabrics, hollow glass microspheres, and inorganic or organic silicon derivatives.

The adhesion improving additives are selected from the group consisting of fatty amines, adhesive resins and waxes.

The viscosity control agents are selected from the group consisting of polyethylene glycols, ether-alcohols, polyethers and higher boiling hydrocarbons.

My invention further includes the use of the coating material for providing a moisture insulating coating on such surfaces as walls, ceilings, dams, channels, floors, bridges, roads or other traffic ways, metal sheets (e.g. cladding sheets), thermal protection elements or thermal blankets and/or sealing of joints and gaps.

In particular my coating material may be contemporaneously used as an adhesive means for an insulating board that is to be applied to the surfaces as set forth herein above.

My coating material may also be used as an anticorrosive coating.

My invention further includes a method for the application of the coating material to a surface as defined herein above wherein the first and the second components are separately conveyed to a mixer and are mixed in it so that the mixture of the components will be sprayed on the surface by means of a spray nozzle.

The mixer may be part of the spray nozzle and the components may be mixed in the spray nozzle.

The components may also be taken from cartouches and conveyed to an adapter for a static mixer.

The following characteristics of the application and resulting advantages of the coating material according to the invention compared to prior art can therefore be deduced:

i. As the reactively hardening coating material for the coating consists of at least 85 to 100 percent active ingredient, up to a third of the material to be used can be spared compared to emulsion systems in order to achieve the desired overall layer thickness. Furthermore the coating material qualifies as well for sealing or respectively filling of cracks, joints, gaps and for creating connections between different building bodies such as sheets, asphalt, curbstones, et al.

ii. The disadvantages caused by the evaporation of water from the layer and the compliance with the minimum film formation temperatures are small or completely avoided, the coatings are fully functional soon after the application (minutes to a few hours). The coating films are impervious and pressure resistant to water, as they do not contain any bubbles caused by emulsifiers.

iii. The weather influences are almost uncritical, as the water dilutability is only of short duration or nonexistent. The minimum film formation temperature is far below zero ° C., however. Therefore the coating material according to the invention can also be used at temperatures close to zero ° C. and in conditions of high air humidity, thus in the late fall and in warm winters in central European climatic zones.

iv. The material according to the invention and the method according to the invention do not require processing temperatures for the material that might lead to burns and therefore guarantee a very high occupational security standard for the executing construction staff.

v. The method according to the invention allows the seamless production of a liquid foil, therefore all complex cutting or overlapping procedures, necessary if sealing sheets are applied, can be omitted. Difficult building geometries as edges, corners, apertures can therefore be sealed against water in a functional and simple manner.

vi. The hardening reaction, that means the transformation from a consistency, capable of flowing and therefore processable when cold, corresponding to the consistency of highly fluid bees' honey into a highly compact consistency which prevents the hardened product from draining off on vertical walls, takes place in such a short time that layers of a thickness of up to 4 mm can be sprayed on or spread with a float in one single working cycle.

vii. There are so few requirements as far as the mixture ratio and the mixture intensity are concerned that both reactive components can be conveyed to the mixing spray nozzle by means of a simple pump system (e.g. gear pumps), can be combined there to a conjoint material stream and be spun on the base to be coated. Already during the free flight the viscosity starts to increase due to the beginning hardening reaction. For construction works with low material requirements, as for reparation purpose, the method also qualifies for packaging in cartouches, for example in 2 component cartouches with an adapter for a static mixer.

viii. Due to the, to a large extent, possible cold working and high pumpability of the two reactive components it is, as far as work procedures are concerned, possible to work with the lowest possible machine equipment, even in areas that are hard to access, as excavation pits often are. The material storage containers, pumps and, if necessary, a compressed air compressor can be positioned at a far distance from the working surface, in areas which are easy to access. The materials can be conveyed for up to 100 meters in thin, unheated tubes so that the staff only has to handle the simply constructed and light airgun (weight of a few kg only) with three tubes (compressed air and 2 material components). The construction work can therefore be executed in a very economical manner.

ix. Thanks to the excellent adhesive characteristics of the coating according to the invention during the hardening process, insulating boards or thermal blankets of all types, even with thermal sensitivity or solvent sensitivity such as polystyrene foam boards can be glued together. It is not necessary to flash off substances under the insulating boards, as the coating hardens reactively, not by distillation.

x. Furthermore the coating according to the invention has anticorrosive characteristics which opens interesting application possibilities, in particular, regarding metal construction.

xi. Compared to pure reactively hardening plastic systems, as the long-known acrylate systems, polyurethane systems, or epoxy resin systems, the method employing the coating material according to the invention, based on bituminous and mineral raw materials, stands out because of its significantly reduced price level, as well as its enormous ability toward crack bridging, and its elastic-viscous solid-body characteristics. Furthermore these classical reactive artificial resin systems generally do not qualify for the application of layers in a thickness of up to 4 mm in one working cycle, as the hardening takes too long to be able to prevent the draining off on vertical surfaces with the low viscosities necessary for cold working.

For processing temperatures close to 0° C. the coating material according to the invention preferably consists of:

Component A:

| | |
|---|---|
| Mixture of bitumen and water, with a preferred ratio of 60 to 40 up to 70 to 30 | 50-100 m % |
| Synthetic latex or natural latex, polyvinyl acetate emulsion or acrylate emulsion or paraffin emulsion or wax emulsion | 0-50 m % |
| Viscosity control agents, like polyethylene glycols, ether-alcohols or polyethers or higher boiling hydrocarbons thixotropic additives as fabrics, hollow glass microspheres, inorganic or organic silicon derivatives adhesion improving additives as fatty amines, adhesive resins, waxes | 0-10 m % |

Component B:

| | |
|---|---|
| Filling additives as rock meal, talc, cement, lime powder, gypsum, fly ash cement, scoria deriving from iron or steel production | 20-50 m % |
| softening non-volatile oil, e.g. an adequate mineral oil, vegetable oil or a derivative thereof, or a synthetic oil, respectively able to start to dissolve the bitumen | 40-80 m % |
| viscosity control agent, dispersing aids, wetting agent for oily phases | 0-10 m % |

Component A is mixed in a ratio of 100:10 up to 50 m % with component B and is afterward applied in a regular layer thickness to the base to be coated by means of a scraper, squeegee, float. The mixture and applying can preferably also occur in a two component spray-on-method.

As an application example for construction works at lower temperatures two components are mixed as follows:

Component A:

| | |
|---|---|
| mixture of bitumen and water | 50 m % |
| synthetic latex or natural latex | 48 m % |
| viscosity control agent | 2 m % |

Component B:

| | |
|---|---|
| filling substances as rock meal, talc, cement | 50 m % |
| linseed oil, tall oil or wood oil | 45 m % |
| viscosity control agent | 5 m % |

The components were mixed in a ratio of 100:20 and displayed the desired characteristics.

What is claimed is:

1. A method for applying a compact hardened coating to a surface which comprises the steps of:
    (a) separately conveying to a mixer:
        (i) a first component which consists essentially of:
            a 60-70% mixture of bitumen and water in a quantity of 50 to 100 partial mass %,
            0 to 50 partial mass % synthetic latex or natural latex, polyvinyl acetate emulsion, or acrylate emulsion, paraffin emulsion or wax emulsion and
            0 to 10 partial mass % viscosity control agent, thixotropic additives and adhesion improving additives; and
        (ii) a second component which consists essentially of:
            20 to 50 partial mass % filling material selected from the group consisting of rock meal, talc, cement, lime powder, gypsum, fly ash cement and scoria derived from iron or steel production,
            40 to 80 partial mass % softening, non-volatile oil and
            0 to 10% by weight viscosity control agent, dispersing aids and wetting agents for oily phases, and wherein the first component and the second component are present in a ratio of 100:10 up to 50 mass %;
    (b) mixing the first and second components in the mixer to form a mixture of the first and second components; and
    (c) applying the mixture of the first and second components onto a surface as a seamless liquid foil, where the first and second components undergo a hardening reaction on the surface to increase viscosity of the seamless liquid foil, and to produce from the seamless liquid foil, a compact, hardened coating on the surface, wherein the compact hardened coating is applied to the surface at a temperature from +1° C., upward, including during late fall or winter.

2. The method for applying a compact hardened coating defined in claim 1 wherein according to step (c), the mixture of the first and second components is applied by spraying onto the surface by means of a spray nozzle.

3. The method for applying a compact hardened coating defined in claim 1 wherein according to step (b), the mixer is part of a spray nozzle and the first and second components are mixed in the spray nozzle.

4. The method for applying a compact hardened coating defined in claim 1 wherein the first and second components are taken from cartouches and conveyed to an adapter for a static mixer.

5. The method for applying a compact hardened coating defined in claim 1 wherein the compact hardened coating is a protective coating for insulating the surfaces from moisture, wherein said surfaces include walls, ceilings, dams, channels, floors, bridges, roads or other traffic ways, metal sheets, thermal protection elements or thermal blankets or the compact hardened coating is formed for sealing of joints and gaps.

6. The method for applying a compact hardened coating defined in claim 1 wherein the compact hardened coating is contemporaneously used as an adhesive for an insulating board that is applied to protect the surface from moisture.

7. The method for applying a compact hardened coating defined in claim 1 wherein the compact hardened coating is applied to the surface as an anti-corrosive coating.

8. The method for applying a compact hardened coating defined in claim 1 wherein according to step (c) the mixture of the first and second components is applied onto a surface as a seamless liquid foil at a temperature of about 0° C. under humid conditions.

9. A two-component composition, wherein each component is kept separate from one another until the two components are applied to a surface for forming a mixture of the two components, to allow seamless production of a liquid foil on the surface, and that hardens reactively to form on the surface, a hardened compact coating, which comprises:
(i) a first component which consists essentially of:
a 60-70% mixture of bitumen and water in a quantity of 50 to 100 partial mass %,
0 to 50 partial mass % synthetic latex or natural latex, polyvinyl acetate emulsion, or acrylate emulsion, paraffin emulsion or wax emulsion and
0 to 10 partial mass % viscosity control agent, thixotropic additives and adhesion improving additives; and
(ii) a second component which consists essentially of:
20 to 50 partial mass % filling material selected from the group consisting of rock meal, talc, cement, lime powder, gypsum, fly ash cement and scoria deriving from iron or steel production,
40 to 80 partial mass % softening, non-volatile oil and
0 to 10% by weight viscosity control agent, dispersing aids and wetting agents for oily phases, and wherein the first component and the second component are present in a ratio of 100:10 up to 50 mass %, wherein the compact hardened coating is applied to the surface at a temperature from +1° C., upward, including during late fall or winter.

10. The two-component composition defined in claim 9 wherein in the second component, the softening, non-volatile oil is a mineral oil, a vegetable oil or a derivative thereof or a synthetic oil.

11. The two-component composition defined in claim 9 wherein in the first component, the thixotropic additives are selected from the group consisting of fabrics, hollow glass microspheres, and inorganic or organic silicon derivatives.

12. The two-component composition defined in claim 9 wherein in the first component, the adhesion improving additives are selected from the group consisting of fatty amines, adhesive resins and waxes.

13. The two-component composition defined in claim 9 wherein in the first component, the viscosity control agents are selected from the group consisting of polyethylene glycols, ether-alcohols, polyethers and higher boiling hydrocarbons.

14. The two-component composition defined in claim 9 wherein the first component consists of a 60-70% mixture of bitumen and water in a quantity of 50 partial mass %, 48 partial mass % synthetic latex or natural latex, and 2 partial mass % viscosity controlling agent; and wherein the second component consists of 50 partial mass % filling material selected from the group consisting of rock meal, talc and cement, 45 partial mass % of a softening non-volatile oil selected from the group consisting of linseed oil, tall oil and wood oil, and 5 partial mass % viscosity control agent, wherein the mass ratio of the first component to the second component is 100:20, wherein the compact hardened coating is applied to the surface at a temperature from +1° C., upward, including during late fall or winter.

15. A method for applying a compact hardened coating to a surface which comprises the steps of:
(a) separately providing:
(i) a first component which consists essentially of:
a 60-70% mixture of bitumen and water in a quantity of 50 to 100 partial mass %,
0 to 50 partial mass % synthetic latex or natural latex, polyvinyl acetate emulsion, or acrylate emulsion, paraffin emulsion or wax emulsion and
0 to 10 partial mass % viscosity control agent, thixotropic additives and adhesion improving additives; and
(ii) a second component which consists essentially of:
20 to 50 partial mass % filling material selected from the group consisting of rock meal, talc, cement, lime powder, gypsum, fly ash cement and scoria derived from iron or steel production,
40 to 80 partial mass % softening, non-volatile oil and
0 to 10% by weight viscosity control agent, dispersing aids and wetting agents for oily phases, and wherein the first component and the second component are present in a ratio of 100:10 up to 50 mass %; and
(b) spraying both the first and second components onto a surface to form thereon a mixture as a seamless liquid foil, where the first and second components undergo a hardening reaction on the surface to increase viscosity of the seamless liquid foil, and to produce from the seamless liquid foil, a compact, hardened coating on the surface, wherein the first and second components are applied to the surface at a temperature from +1° C., upward, including during late fall or winter.

\* \* \* \* \*